United States Patent Office 3,185,230
Patented May 25, 1965

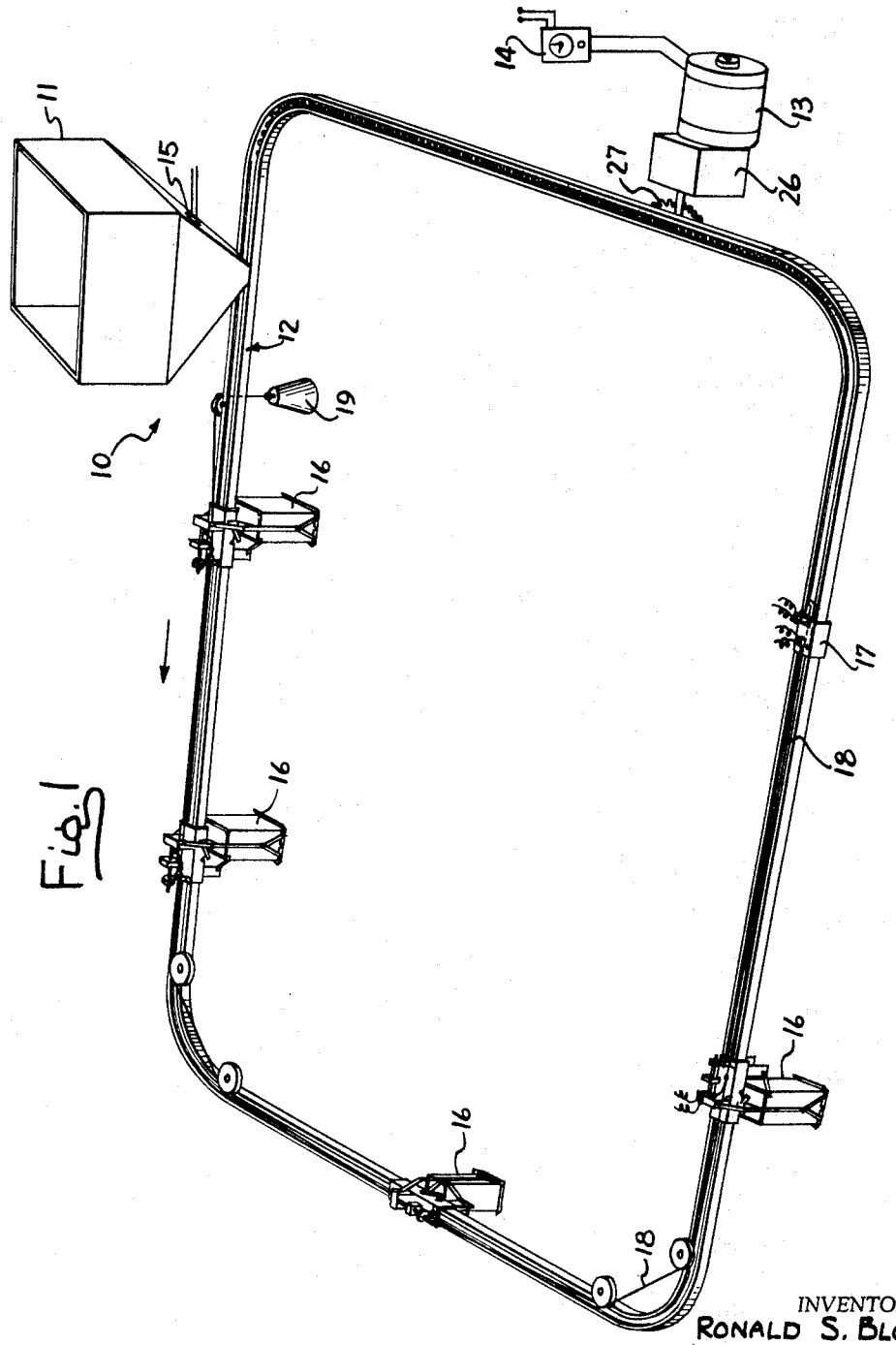

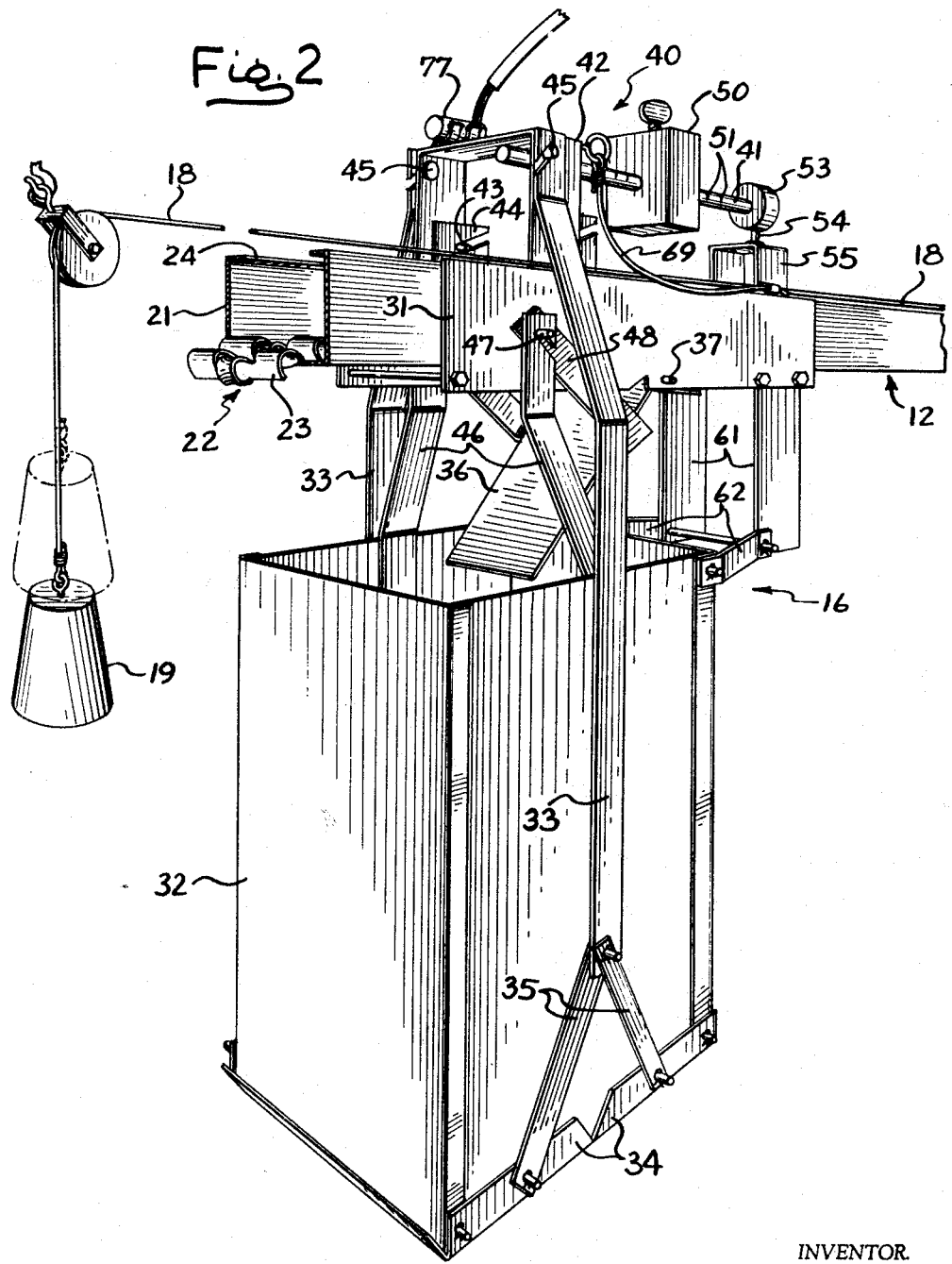

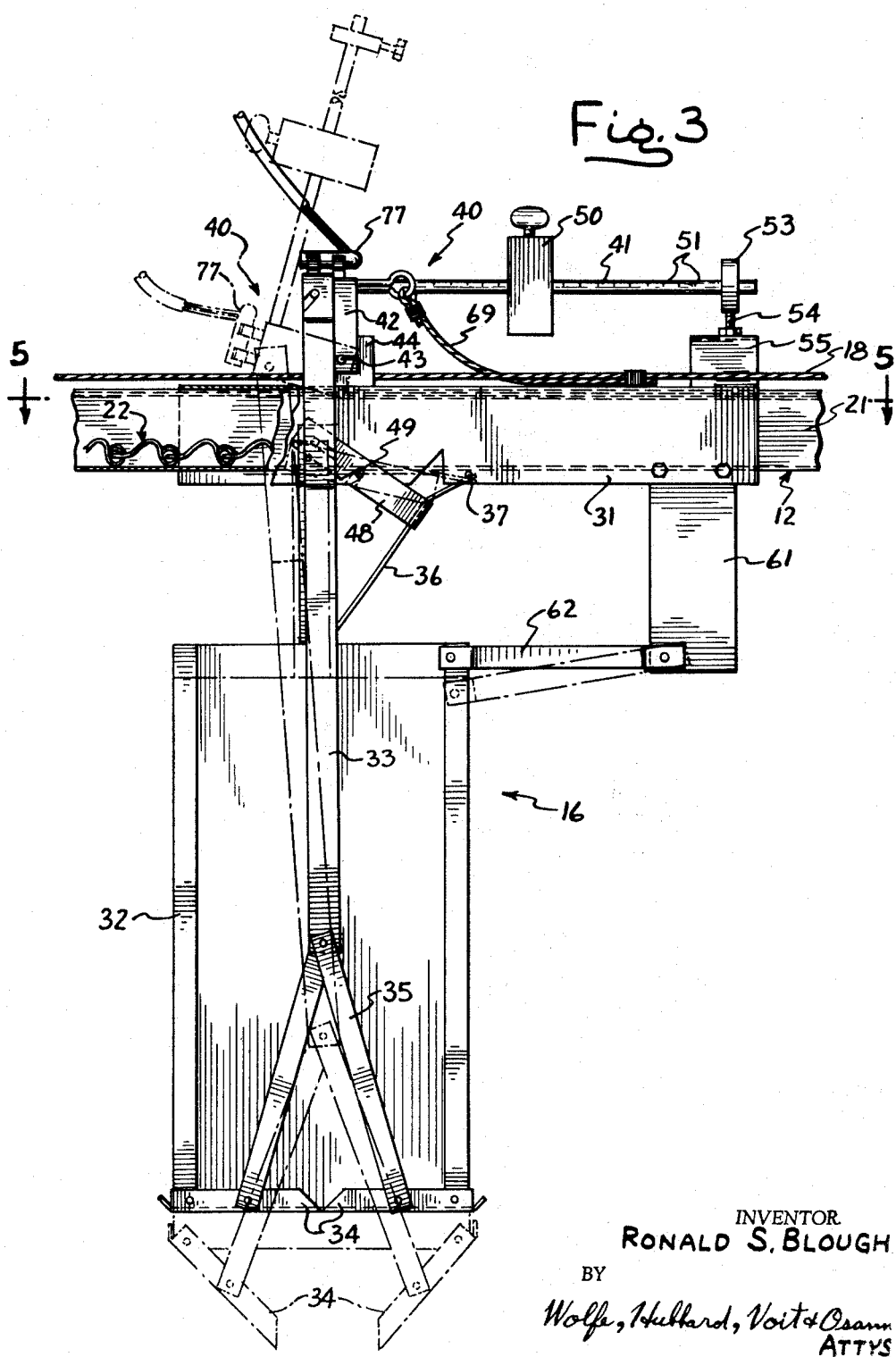

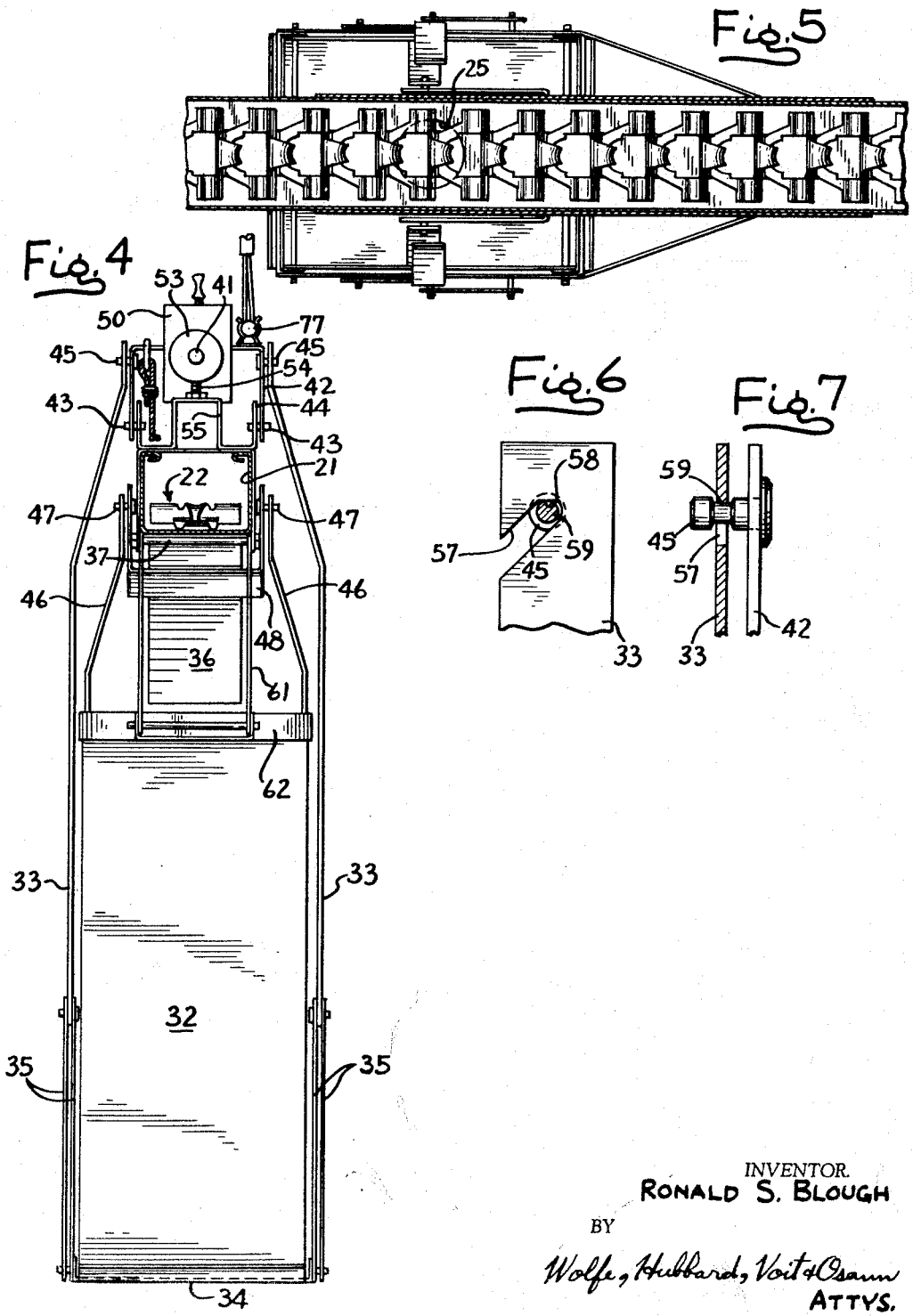

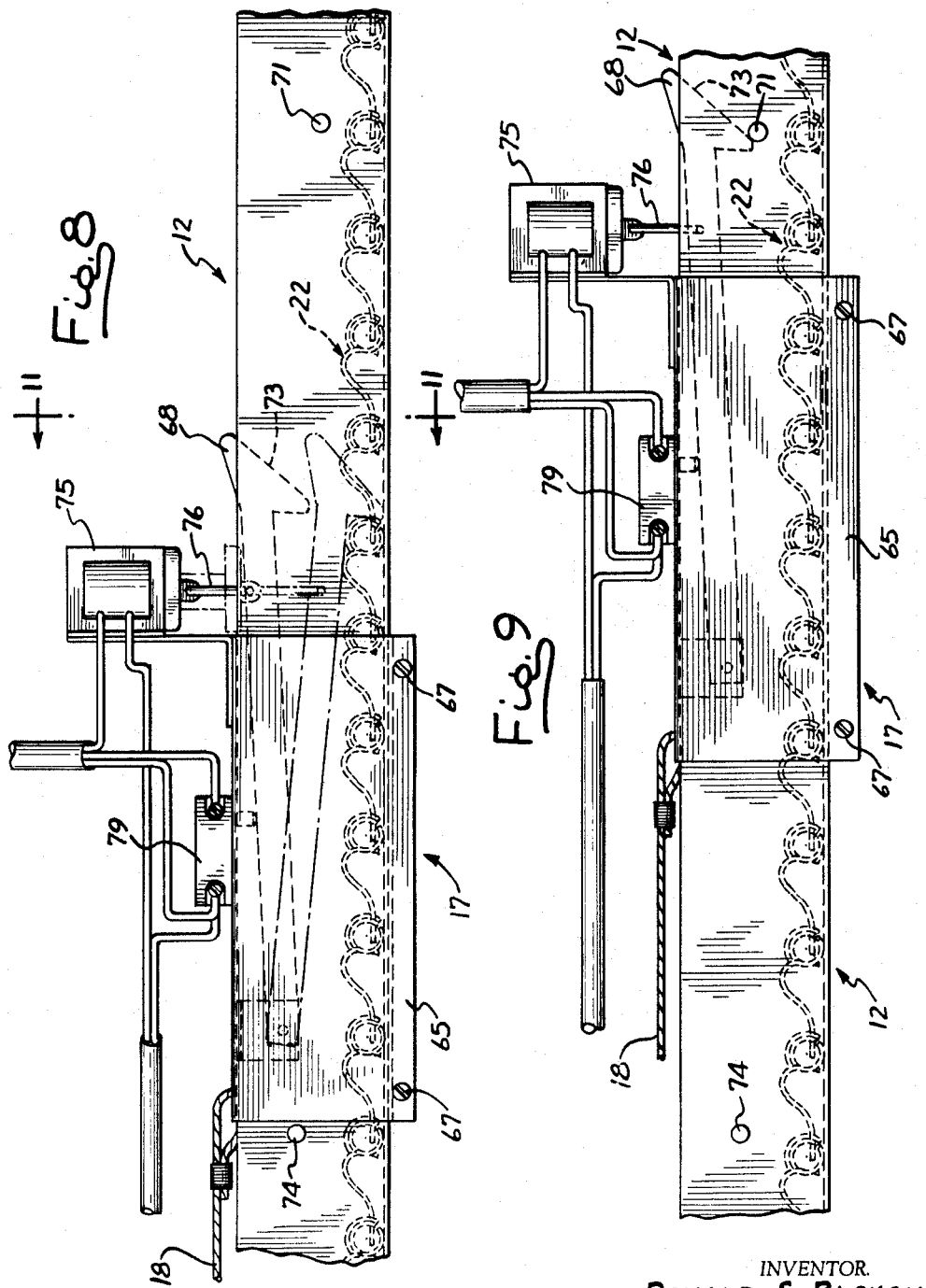

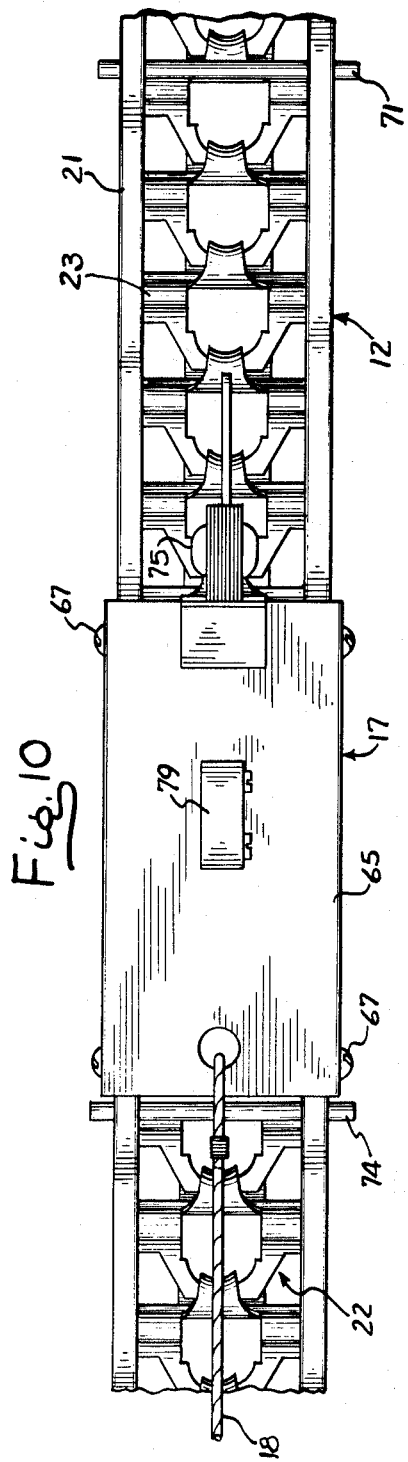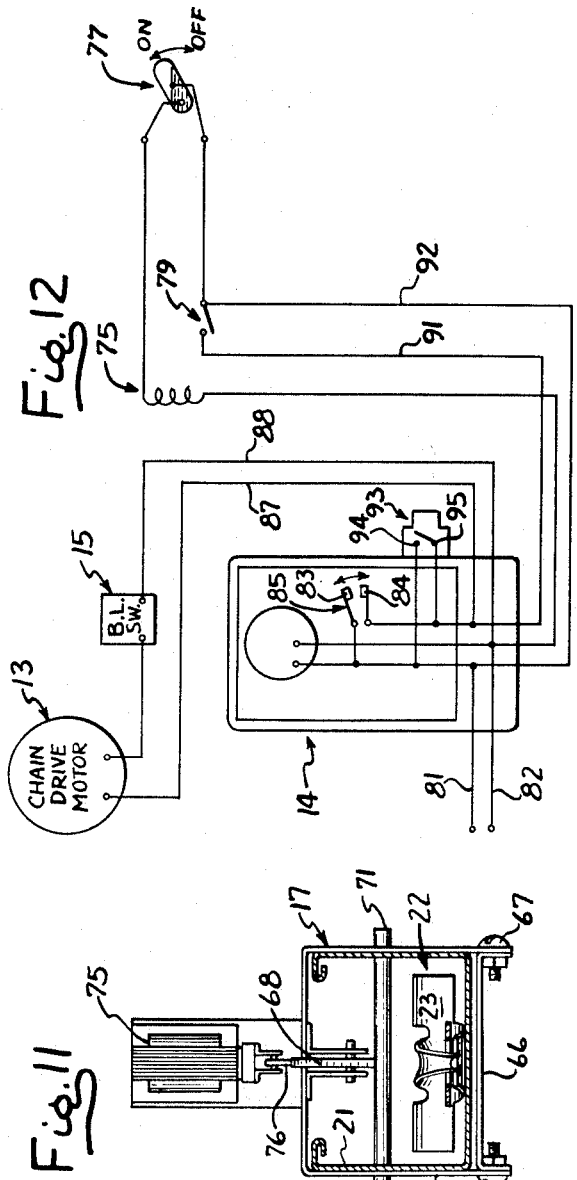

3,185,230
APPARATUS FOR AUTOMATIC WEIGHING AND DISTRIBUTING FEED FOR LIVESTOCK
Ronald S. Blough, Fairfield, Iowa, assignor to Fairfield Engineering and Manufacturing Company, Fairfield, Iowa, a corporation of Iowa
Filed Apr. 2, 1963, Ser. No. 270,068
8 Claims. (Cl. 177—71)

The present invention relates generally to an apparatus for feeding livestock and more particularly concerns a mechanism for automatically distributing a controlled portion of feed to one or more livestock feeding stations.

In recent years there has been a growing consumer demand for high quality, lean-type meat at reasonable prices. One of the major improvements in the production of meat type animals results from proper breeding and selection techniques to increase the size of the lean meat portion on animal carcasses. The production of lean meat animals also requires close control and accurate proportioning of each animal's feed in order to get proper growth and production of lean tissues without excess back-fat and internal fatty tissues.

It has also been found that by limiting the quantity of feed per feeding and by feeding livestock more often, the animals consume all of the feed which is provided and also have more efficient growth rates. This results in saving the feed that the animals normally waste, which often amounts to 10% or more of the total feed provided. However, more frequent feeding of reduced amounts of feed requires additional time and labor to accurately control and distribute the desired quantities at regular time intervals unless new distribution systems and techniques are developed.

Accordingly, the primary aim of the present invention is to provide a novel apparatus for automatically weighing and distributing accurately controlled portions of feed to one or more livestock feeding stations. It is a related object to provide means for automatically starting the feed weighing and distributing mechanism at pre-set intervals and to provide means for automatically stopping the mechanism after feed has been distributed to each feeding station.

It is a further object to provide a simple and inexpensive weighing mechanism for dropping controlled portions of feed at various points along a feed distribution conveyor.

An additional object is to provide an accurate, yet rugged, mechanism for selectively changing the weight of feed to be dropped at any particular feeding station.

It is yet another object to provide means for manually starting the feed distribution mechanism independent of the automatically controlled distribution sequence, and also to provide means for automatically disengaging the feeding mechanism when the supply of feed is exhausted.

A more particular object is to construct each of the individual weighing devices for quick tripping from the cocked position as soon as the preselected weight of feed is delivered. It is a correlated object to provide means whereby this fast tripping action provides the power necessary to shut off the supply of feed from the conveyor and which also provides sufficient additional momentum for discharging the weighed portion of feed.

It is also an object to provide a mechanism for automatically cocking the weighing devices from the power available in the conveyor mechanism.

Still another object is to provide such a weighing device which may be easily and economically constructed using mass production techniques and yet which is accurate and rugged in operation and may be easily and conveniently adjusted to overcome minor misalignments and abuse which may occur in installation or operation.

Other objects and advantages of the invention will become apparent upon reading the following detailed description and upon reference to the drawings, in which:

FIGURE 1 is a schematic illustration of a feed distribution arrangement employing the novel controlled weighing apparatus of the present invention;

FIG. 2 is an enlarged perspective view of one of the controlled portion weighing devices shown in FIG. 1;

FIG. 3 is a side elevation of the weighing device of FIG. 2, with solid lines showing the cocked position and dash lines illustrating the tripped position of the device;

FIG. 4 is an end elevation of the device shown in FIGS. 2 and 3;

FIG. 5 is a section taken substantially along the lines 5—5 in FIG. 3;

FIGS. 6 and 7 are respectively enlarged fragmentary side and partial cross sectional views illustrating the rolling pivots utilized in the device shown in FIGS. 2-5;

FIG. 8 is a side elevation of the mechanism for cocking the feed weighing units with dash lines showing alternate positions of the driving member;

FIG. 9 is a side elevation of the cocking mechanism, illustrated at the end of its actuating movement;

FIG. 10 is a plan view of the cocking mechanism shown in FIG. 8;

FIG. 11 is a view taken substantially along the line 11—11 in FIG. 8; and

FIG. 12 is a circuit diagram for the automatic control mechanism.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown in FIGURE 1 an automatic livestock feed weighing and distributing arrangement 10 constructed in accordance with the present invention. A large hopper or bin 11 is provided for storing bulk quantities of feed prepared and mixed of the proper constituents to meet the requirements of the particular livestock being fed. Feed from the bin 11 is distributed through a conveyor 12 which passes over a plurality of livestock feeding stations. It will be understood that the feeding stations may be separated by partitions or pens within a building or may be fenced-off enclosures which are located outside the building. Each station may contain one or more animals and the quantity of feed distributed to each station is proportioned accordingly.

The conveyor 12 is driven by a motor 13 which is intermittently energized through an automatic timing clock 14 that may be set to operate the conveying mechanism at preselected intervals. To prevent operation of the conveyor 12 when there is insufficient feed in the bin 11, a safety switch 15 is located near the bottom of the bin and connected in series with the motor energizing circuit. If the quantity of feed in the bin falls below the level of the switch 15, the switch contacts open the motor starting circuit and the conveyor remains inoperative until additional feed is supplied to the bin.

Adjacent each feeding station the conveyor 12 supports a weighing unit 16 which may be set to weigh and deposit a controlled portion of feed. As feed is distributed from the conveyor 12, each of the successive weighing units 16 automatically trips and deposits its controlled portion of feed into the separate feeding stations. When the last weighing unit trips, the feeding cycle is completed and a control switch is automatically opened to deenergize the motor circuit. In the illustrative embodiment, the conveyor 12 also supports a cocking mechanism 17 which serves to simultaneously cock all of the weighing units 16 at the beginning of each operating cycle. The cocking mechanism 17 in this instance is located remotely from the storage bin 11 and the last weighing unit 16 in the direction of travel of the conveyor mechanism 12. An actuating cable 18 couples the cocking mechanism 17 and each of the weighing units 16. For returning the cocking mechanism to its starting position after all of the weighing units have been cocked, a suspended weight 19 is attached to the opposite end of the actuating cable 18.

The conveyor

For distributing the feed from the bin 11 to the weighing units 16, it will be appreciated that any suitable conveyor mechanism might be used. Thus, for example, the conveyor may be a drag chain, an auger, a pneumatic conveyor or even a liquid-feed pump conveyor. However, for the purpose of illustration, only a conveyor of the drag chain type will be herein described in detail. Nevertheless, it will be understood that any of the other types of conveyor systems might also be used without departing from the present invention.

As shown in FIGS. 2–5 and 8–10, the illustrative conveyor 12 includes a generally channel-like housing 21 which encloses an endless drag chain 22 comprising a plurality of interlocking links 23. The housing 21, in this instance, is preferably formed of sheet metal and provides a sturdy and rugged support for each of the weighing units 16 and the cocking mechanism 17. The channel-like housing also defines a continuous opening 24 along its upper side which permits convenient inspection of both the feed and the drag chain 22 at any point along the conveyor 12.

The conveyor 12 passes through the lower portion of the storage bin 11 where the drag chain 22 receives feed to be distributed to the weighing unit 16. Preferably, the feed from the bin 11 is metered into the conveyor so that it moves along the channel-like housing 21 without overflowing the opening 24. The conveyor continues away from the bin 11 and is located over and above each of the separate livestock feeding stations. To allow feed to drop from the conveyor 12 into the weighing units 16, the housing 21 defines an opening 25 over each weighing unit. Since the drag chain 22 is continuous, the conveyor 12 circles back through the bin 11 after successively distributing feed to each of the weighing units. The chain 22 is driven by the motor 13 through a speed reduction unit 26 and drive gear 27.

The weighing units

Referring now to FIG. 2, there is shown an enlarged perspective view of one of the controlled portion weighing units 16. Since all of the weighing units are identical, it will be sufficient to describe a single one of the units in detail. In the preferred embodiment, the weighing unit 16 is rigidly mounted on the conveyor 12 by means of a generally channel-shaped frame 31 which overlies the conveyor housing 21. Suspended below the frame 31 is a weighing tube 32, which is supported by a pair of depending parallel links 33. The tube 32 is thus located to receive feed deposited from the conveyor 12 through the opening 25. For holding feed in the weighing tube 32, a bottom closure is provided which, in the present instance, comprises a pair of center opening doors 34 hinged to the bottom of the tube 32 and connected through a linkage 35 to the lower ends of the links 33. To shut off the supply of feed to the weighing unit, a door 36 is hinged to the frame 31 by a cross pin 37 and is located to selectively block the opening 25 (see FIG. 5).

In accordance with the present invention, a balancing mechanism 40 is provided for accurately weighing a predetermined amount of feed which has been distributed by the conveyor 12 to the weighing unit 16. In the preferred embodiment, the balancing mechanism 40 is arranged to automatically trip when the feed in the tube 32 reaches a preselected weight. In addition, tripping the balancing mechanism 40 also blocks the flow of additional feed through the opening 25 into the weighing unit 16 and subsequently discharges the weighed portion of feed from the tube 32 into the feeding station.

The balancing mechanism 40 includes a graduated balance arm 41 secured to an end bracket 42 pivotally mounted on pins 43 located in upright mounting brackets or extensions 44 secured to the frame 31. The upper ends of the depending links 33 are also pivotally mounted on a pair of pivot pins 45 secured to the end bracket 42 of the balancing mechanism 40. The pins 45 are spaced horizontally from the pins 43 in the direction away from the balance arm 41. The force for tripping the balancing mechanism is exerted through the depending links 33 due to the combined weight of the tube 32 and the predetermined amount of feed which it contains. The tripping action rotates the end bracket 42 in a counterclockwise direction as seen in FIG. 3 about the pivot pins 43 thereby raising the balance arm 41 and lowering the depending links 33.

The initial descending movement of the links 33 also allows the weighing tube 32 to drop away from the conveyor 12 and supporting frame 31. The weighing tube 32 carries a pair of straps 46 which are pivoted on pins 47 to a trip member 48 also pivoted to the frame 31 by pins 49. Downward movement of the straps 46 causes the trip member 48 to rotate in a counterclockwise direction about its pivot pins 49, thereby swinging the door 36 in blocking relation to the opening 25. Further downward movement of the tube 32 is then prevented since the trip member 48 serves as a stop arresting the downward travel of the straps 46.

The depending links 33, however, continue their downward travel, which is also now relative to the weighing tube 32, and this further movement is carried through the linkage 35 to the hinged doors 34. Relieving the tension in the linkage 35, of course, permits the weight of the feed in the tube 32 to urge the doors 34 to their open position dscharging the feed from the weighing unit 16 (see FIG. 3). It will now be appreciated that as the balancing mechanism 40 is tripped, first the door 36 is actuated to block the opening 25 thereby preventing additional feed from dropping into the weighing tube 32, and thereafter, the predetermined amount of feed in the tube is discharged by opening the hinged doors 34.

It is a further important feature of the present invention that the weight of feed to be deposited by each weighing unit 16 can be simply and conveniently changed. To control the amount of feed in the tube 32, which is effective to trip the balancing mechanism 40, a movable weight 50 is mounted at a selected position along the balance arm 41. Since the balance arm pivots about the pins 43, it will be appreciated that the weight 50 exerts its force through a moment arm determined by the horizontal distance that its center of gravity is located from the pivot pins 43. On the other hand, the weight of the drop tube 32, through the depending links 33, exerts its force through a much shorter lever arm defined by the horizontal distance between pivot pins 43 and 45. Therefore, a relatively small movable weight 50 is effective to control the weighing of relatively large amounts of feed which are deposited in the weighing tube 32. In addition, by smply moving the weight 50 on the balance arm 41, thereby changing its moment arm, the balancing mechanism 40 is also effective to precisely control a wide range of weights including very small quantities of feed.

So that the proper amount of feed can be selected, the balance arm 41 is marked with calibrations 51 evenly spaced along its length. The extreme left calibration marking 51, as shown in FIG. 3, is the zero weight marking. In other words, when the weight 50 is selectively indexed adjacent the left-hand calibration, the feed weighing unit 16 is a balanced condition. By moving the weight 50 slightly to the left of the zero calibration the tube 32 drops since its weight overcomes that of the weight 50 in this position. Conversely, positioning the weight 50 progressively farther to the right on the balance arm 41 correspondingly increases the amount of feed which must be deposited in the tube 32 before it overbalances the weight and trips the balancing mechanism.

Provision has also been made for adjusting each weighing unit 16 for accuracy so that the feed deposited corresponds to the selected weight. In adjusting the balance arm 41, the weight 50 is first set at the zero calibration. Then an auxiliary weight 53, located on the outer end of the balance arm 41, is positioned to exactly balance the weight of the drop tube 32 and its linking mechanism. To adjust the full scale reading, the weight 50 is then indexed adjacent the extreme right calibration 51 on the scale arm 41 and a weight equivalent to the full scale reading is hung on the bottom of the drop tube 32. The length of an adjusting screw 54 on the auxiliary weight 53 is varied to select the vertical position of the balance arm 41 respective to an arresting bracket 55 mounted on the upper portion of the frame 31.

By adjusting the stop screw 54 to decrease its length, the end of the balance arm will come to rest closer to the bracket 55 and thereby decrease the horizontal component of the lever arm for the weight tube 32. If the assembly does not trip when the weight 50 is set at the full scale reading and an equivalent weight is placed on the drop tube 32, the adjusting screw 54 is lengthened so that the scale arm 41 is raised and the drop tube lever arm is increased to a point where the assembly will trip at this setting. By repeating the zero scale setting and the full scale setting until both are accurate, all of the intermediate scale calibrations 51 will also be accurate since the calibrations are evenly spaced. It will also be appreciated that as a result of this simple adjusting arrangement the individual components of the weighing unit 16 may be manufactured from standard construction elements or parts without the necessity of extreme precision or accuracy.

It is also a feature of the present inventon that the arrangement of the pivot pins 43 and 45 in the bracket 42 provides fast breaking movement when the balancing mechanism 40 is tripped. In other words, as soon as the weight of the tube 32 and the feed deposited therein exceeds the pre-selected value, the counterclockwise movement of the bracket 42 acts to increase the load moment arm of the tube 32 about the pin 45, while the clockwise weight moment arm of the balance arm 41 is simultaneously decreasing. This fast breaking action serves to provide additional downward momentum of the dependng links 33 in order to first close the door 36 and subsequently to open the hinged doors 34 thereby depositing the feed.

To further assist the fast breaking action and to overcome the starting inertia incident to tripping the balancing mechanism 40, the pins 43, 45, 47 and 49 are constructed to serve as rolling pivots for the corresponding members which are attached thereto. Referring to FIGS. 6 and 7, the pin 45 and upper end of support link 33 are illustrated to show the preferred construction of these rolling pivots. The link 33 defines a slot 57 having a flat, substantially horizontal base portion 58 substantially wider than a reduced journal portion 59 of the pin 45 which supports the link. With the weighing mechanism in the cocked position as shown in the solid line position of FIG. 3, the pin 45 is located near the left hand end of the flat base 58.

As the balancing mechanism 40 is tripped the counterclockwise movement of the bracket 42, to which the pin 45 is rigidly secured, causes the pin to rotate in a counterclockwise direction and thus roll to the right. In short, this reduces the friction between the link 33 and pin 45 from the ordinary sliding friction of a simple journal connection to rolling friction during the initial counterclockwise movement of the tripping mechanism. After the pin 45 rolls to the end of the base 58, of course, sliding friction takes over. But, at this point, due to the increasing counterclocwise moment arm there is sufficient momentum to overcome the friction.

In order to prevent the weighing assemblies 16 from swinging due to drafts or air currents which may occur in the building where they are installed, stabilizers 61 are mounted from the frame 31 and carry pivotally mounted stiffening links 62, connected to the upper portion of the drop tube 32. The stabilizers 61 and stiffening links 62 prevent swinging movement of the hopper without exerting any lateral forces on the drop tube 32 when it moves from the cocked position to the tripped position.

The cocking carriage

After each of the weighing units 16 have been tripped depositing their controlled portions of feed at the individual feeding stations, it is necessary to recock each of the balancing mechanisms 40. For this purpose it will be appreciated that any suitable actuator might be utilized without departing from the novel features of the weighing units. In the present instance, the weighing units are cocked at the beginning of each feeding cycle by the novel cocking carriage 17 which utilizes movement of the drag chain 22 to provide the cocking movement.

Turning now to FIGS. 8–11, the illustrative cocking carriage 17 is shown mounted on the conveyor tube 12 for cocking each of the weighing units 16 at the beginning of each feed distributing cycle. The cocking carriage 17 comprises a generally channel-shaped slide frame 65 which overlies the conveyor tube 12 and is retained in position by means of a lower mounting plate 66 secured to the frame 65 by bolts 67. Pivotally mounted from the upper rear portion of the frame 65 is a hook member 68 which is adapted to engage the drag chain 22 as shown in FIG. 8. The actuating cable 18 is coupled to the rear portion of the cocking carriage 17 and extends rearwardly over the conveyor tube 12 past each of the weighing units 16 and terminates adjacent the storage bin 11 suspending the weight 19. A short cocking cable 69 interconnects the actuating cable 18 and the balancing mechanism 40 of each of the weighing units 16.

To cock the weighing units 16 at the beginning of each feeding cycle, the hook 68 engages the drag chain 22 pulling the cocking carriage 17 forward and drawing the actuating cable 18 in the direction of chain travel. As the actuating cable 18 moves forwardly, each of the cocking cables 69 pull the balance arms 41 from the tripped position, shown in dash lines in FIG. 3, to the cocked position shown, in solid lines, in FIG. 3. Once the weighing units 16 are cocked, of course, the weights 50 hold the weighing units in readiness until sufficient feed has been deposited by the conveyor 12 to trip the balancing mechanisms 40 at the next feeding cycle.

To raise the hook 68 after the weighing units 16 have been cocked, a cross pin 71 mounted transversely across the conveyor tube 12 engages a cam surface 73 formed on the forward end of the hook. The hook 68 is thus cammed upwardly and out of engagement with the drag chain 22. The cross pin 71 is located sufficiently forward of the starting position of the carriage 17 so that all of the weighing units 16 are cocked prior to disengaging the hook.

When the hook 68 is disengaged from the drag chain 22, the weight 19 at the opposite end of the actuating cable 18 serves to draw the cocking carriage 17 rearwardly on the conveyor tube 12 against a stop pin 74 to the starting position shown in FIG. 8. This places the cocking carriage 17 in a position of readiness for cocking the weighing units 16 at the beginning of the next operating cycle.

For holding the hook 68 in raised position allowing the drag chain 22 to continuously move forwardly distributing feed to the weighing units 16, a solenoid 75 is mounted on the cocking carriage 17 and coupled to the hook 68 by a link 76. When the solenoid 75 is energized, the link 76 is drawn upwardly and holds the hook 68 in the raised position shown in the upper dash line position of FIG. 8. On the other hand, when the solenoid is deenergized, the hook 68 is dropped into engagement with the chain 22.

In the preferred embodiment, actuation of the solenoid 75 is controlled by a mercury-type tilt switch 77 which is mounted on the balancing mechanism 40 of the feed weighing unit 16 located farthest from the storage bin in the direction of travel of the drag chain 22. It will be understood, however, that the switch 77 may be moved to any of the other weighing units 16, when less than all of the units are needed for the feeding operation. As shown in FIGS. 2 and 3, the switch is mounted on the balance arm bracket 42. Preferably, the mercury switch 77 is constructed to close when it is in the solid line position shown in FIG. 3 and to open when in the dash line position.

During the feed distributing cycle, the switch 77 is closed and the solenoid 75 is energized holding the hook 68 in the raised position. Raising the hook 68 by the cam pin 71 and holding it in the raised position by actuation of the solenoid 75, also closes the contacts of a holding switch 79 to continue the energization of the chain drive motor 13. When the last weighing unit 16 trips, the switch 77 is tilted deenergizing the solenoid 75 and dropping the hook 68 thereby opening the holding switch 79 of the motor 13. The hook then falls into engagement with the drag chain 22 ready to pull the cocking carriage forward at the beginning of the next cycle.

*The control circuit*

Referring now to FIG. 12, there is shown a schematic wiring diagram of the control circuit for the feed weighing and distributing mechanism of the present invention. The timing clock 14 is driven by electric line voltage supplied through supply wires 81 and 82. A pair of starting contacts 83 and 84 located in the timer 14 are closed by a cam operator 85 at preset intervals during the timing cycle. Closing the contacts 83, 84 energizes the chain drive motor 13 through wires 87 and 88, provided that the bin level switch 15 is closed indicating sufficient feed in the storage bin 11 for the feeding cycle.

The timing clock 14 is preferably a short interval timer in which the cam operator 85 only holds the contacts 83, 84 in closed position for an interval of approximately two minutes. However, this is considerably less than the time required to complete the feeding cycle, and therefore a holding circuit is provided for continued energization of the chain drive motor 13. In the present arrangement, the holding circuit is completed by closing the holding switch 79, when the hook 68 is in the raised position, thereby completing a circuit through supply lines 81, 82 holding lines 91 and 92 and the motor supply lines 87, 88. As mentioned above, at the end of the feed distributing cycle, the mercury switch 77 tilts to the switch-open position when the last weighing unit 16 is tripped. This deenergizes the solenoid 75 dropping the hook 68 and opening the contacts of the holding switch 79 thereby breaking the holding circuit through wires 91 and 92 to the chain drive motor and terminating the operating cycle. The circuit is then in condition for reenergization at the next preselected time when the timing cam operator 85 closes the contacts 83 and 84.

Provision has also been made to allow manual operation of the starting mechanism so that a livestock producer may initiate the feeding cycle and observe the entire feed weighing and distributing mechanism in operation. Manual starting is initiated by a push button switch 93 located on the housing of the timer 14. Depressing the switch 93 closes switch contacts 94 and 95 and momentarily energizes the chain drive motor 13 through lines 87, 88. The switch 93 is retained in its closed position until all of the weighing units 16 are cocked by the cocking carriage 17 and then the motor 13 is held in the operating circuit including holding switch 79.

*Operation*

The operation of the feed weighing and distributing mechanism 10 is initiated by the timing clock 14. It will be understood that the timing clock may be set to close the starting contacts 83, 84 at preselected intervals during the day. If there is sufficient feed in the bin 11 for a feeding cycle, the safety switch 15 is closed, and closing contacts 83, 84 energize the drag chain motor 13.

As the drag chain moves forward, the hook 68 pulls the cocking carriage 17 on the conveyor housing 12 and through the cable 18 cocks all of the weighing units 16. At the end of the cocking movement the hook strikes the cross pin 71 and is raised out of engagement with the drag chain 22. Since all of the weighing units are now cocked, the switch 77 on the last unit is closed and the solenoid 75 is energized to hold the hook 68 in the raised position. With the hook in the raised position, the holding switch 79 is also closed and the motor 13 remains energized even after the contacts 83, 84 of the short interval timer have opened. Also after the hook is raised, the weight 19 attached to the cable 18 pulls the cocking carriage to its starting position against pin 74.

The drag chain continues to circle within the conveyor housing 21 carrying feed from the bin 11 toward the successive weighing units 16. As the feed reaches the first weighing unit it drops through the opening 25 into the weighing tube 32. When the feed in the first weighing unit reaches the preselected weight, the balancing mechanism 40 is tripped which drops the tube 32 away from the conveyor 12. This dropping motion first swings the door 36 into blocking relation with respect to the opening 25 preventing the delivery of additional feed into the tube, and then opens the doors 34 to discharge the controlled portion of feed from the tube. Each of the other weighing units are successively tripped in the same manner.

When the last, or control, weighing unit 16 is tripped, the switch 77 is opened deenergizing the solenoid 75 and dropping the hook 68. This also opens the holding switch 79 shutting off the chain drive motor 13. Thus, one feeding cycle is completed and all of the elements of the feed weighing and distributing mechanism 10 are again in their initial positions ready for the next operating cycle set by the timer 14.

It will also be remembered that each weighing unit 16 may be individually set to distribute a controlled portion of feed simply by positioning the weight 50 on the balance arm 41. Moreover, each of the balancing mechanisms 40 can be adjusted for accuracy to compensate for minor misalignments and slight differences in the individual components. In addition, the arrangement of the pivot pins 43 and 45 provide quick tripping action which develops substantial momentum for both blocking the opening 25 and opening the doors 34. This quick tripping is further facilitated through the use of rolling pivots 43, 45, 47 and 49 which minimize the friction during the critical initial starting movement of the tripping mechanism.

From the foregoing it will be appreciated that the novel feed weighing and distributing mechanism 10 may be simply and easily constructed using elements produced on a mass production basis. Nevertheless, the individual weighing units can be easily and accurately adjusted to correctly weigh and discharge the desired quantity of feed to each feeding area or station. Moreover, the entire weighing and distributing cycle is automatically controlled and the livestock can be fed small controlled portions of feed as many times during the day as desired.

I claim as my invention:

1. In a livestock feed weighing and distributing mechanism, the combination comprising, a housing enclosing a feed conveyor means, a feed depositing unit mounted on said conveyor housing, said conveyor housing having an opening into said depositing unit, means for blocking said opening, weighing means for sensing a preselected weight of feed in said depositing unit, tripping means for first actuating said blocking means and then discharging said depositing unit in response to said weighing means sensing said preselected weight of feed, and means including a member engageable with said conveyor means for cocking said tripping means whereby said blocking means is removed from said opening and said weighing means is again conditioned to sense said preselected weight of feed.

2. In a livestock feed weighing and distributing mechanism, the combination comprising, a housing enclosing a feed conveyor means, a drive for said conveyor means, a feed depositing unit mounted on said conveyor housing adjacent an opening therein, means for blocking said opening, weighing means for sensing a preselected weight of feed in said depositing unit, tripping means for first actuating said blocking means and then discharging said depositing unit in response to said weighing means sensing said preselected weight of feed, means including a member engageable with said conveyor means for cocking said tripping means whereby said blocking means is removed from said opening and said weighing means is again conditioned to sense said preselected weight of feed, and means for deenergizing said drive in response to actuation of said tripping means.

3. In a livestock feed weighing and distributing mechanism, the combination comprising, a housing enclosing a feed conveyor means operated cyclicly by a timer, a feed depositing unit mounted on said conveyor housing adjacent an opening therein, means for blocking said opening, weighing means for sensing a preselected weight of feed in said depositing unit, tripping means for first actuating said blocking means and then discharging said depositing unit in response to said weighing means sensing said preselected weight of feed, means for stopping said conveyor means upon actuation of said tripping means, and means including a member engageable with said conveyor means for cocking said tripping means whereby said blocking means is removed from said opening and said weighing means is again conditioned to sense said preselected weight of feed when said conveyor is again started.

4. In a livestock feed weighing and distributing mechanism including a plurality of individual feed weighing units having trippable discharging devices mounted on a conveyor housing enclosing feed conveying means, the combination comprising, a cocking carriage mounted on said housing for sliding movement thereon, a gripping hook pivotally suspended on said carriage for selective engagement with said conveying means, means coupling said carriage with each of said weighing unit devices so that when said hook is engaged with said conveying means said carriage travels on said housing and cocks said devices.

5. In a livestock feed weighing and distributing mechanism including a plurality of individual feed weighing units having trippable discharging devices mounted on a conveyor housing enclosing feed conveying means, the combination comprising, a cocking carriage mounted on said housing for sliding movement thereon, a gripping hook pivotally suspended on said carriage for selective engagement with said conveying means, means coupling said carriage with each of said weighing unit devices so that when said hook is engaged with said conveying means, said carriage travels on said housing and cocks said devices, one of said devices including switching means, and a solenoid mounted on said carriage for selectively raising and lowering said hook, said switching means connected to said solenoid to drop said hook in response to said device being tripped.

6. A livestock feed weighing and distributing mechanism comprising, in combination, a conveyor housing enclosing conveyor means for distributing feed to a plurality of feeding stations, a feed weighing tube mounted adjacent said conveyor at each of said stations, said conveyor having an opening therein at each station for depositing feed into each of said tubes, balancing means for sensing a preselected weight of feed in each of said tubes, means for retaining feed in said tubes until said preselected weight is sensed, means for blocking said openings when said preselected weight of feed is sensed, said retaining means being coupled to a tripping linkage associated with said balancing means for discharging the feed from said tubes, and cocking means coupled to said balancing means, said cocking means including a member engageable with said conveyor means and arranged to return said balancing means, blocking means and retaining means to their original positions after the preselected weight of feed is discharged from said tube.

7. The combination according to claim 6 wherein said conveyor means includes a moving drag chain, said cocking means includes a carriage mounted on said conveyor housing for sliding movement thereon, a gripping hook pivotally suspended on said carriage for selective engagement with said drag chain and means coupling said carriage with each of said balancing means so that when said hook is engaged with said moving drag chain said balancing means are returned to their original positions.

8. The combination according to claim 7 wherein said drag chain is moved by a cyclically energized drive motor under control of a time clock, said cocking carriage mounts a solenoid and a switch connected in series with said solenoid and in parallel with said motor, said solenoid when energized by said switch being effective to hold said hook out of engagement with said drag chain, and means for initially disengaging said hook from said chain and closing said switch after said balancing means are returned to their original positions.

References Cited by the Examiner
UNITED STATES PATENTS

| | | | |
|---|---|---|---|
| 490,710 | 1/93 | Hartley | 177—112 |
| 688,807 | 12/01 | Young | 117—112 |
| 967,935 | 8/10 | Kneeland | 177—71 |
| 2,003,417 | 6/35 | Andreas | 214—17 |
| 2,743,860 | 5/56 | Saxe | 222—412 X |
| 2,962,191 | 11/60 | Moore | 222—412 X |
| 2,995,783 | 8/61 | Lytton | 177—114 |

LEO SMILOW, *Primary Examiner.*